US010186072B2

(12) United States Patent
Peng

(10) Patent No.: US 10,186,072 B2
(45) Date of Patent: *Jan. 22, 2019

(54) RENDERING VIA RAY-DEPTH FIELD INTERSECTION

(71) Applicant: OTOY INC., Los Angeles, CA (US)

(72) Inventor: Hsuan-Yueh Peng, Los Angeles, CA (US)

(73) Assignee: OTOY, INC., Los Angeles, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/827,908

(22) Filed: Nov. 30, 2017

(65) Prior Publication Data

US 2018/0089886 A1 Mar. 29, 2018

Related U.S. Application Data

(63) Continuation of application No. 14/702,572, filed on May 1, 2015, now Pat. No. 9,852,537.

(51) Int. Cl.
 *G06T 15/06* (2011.01)
(52) U.S. Cl.
 CPC .................................. *G06T 15/06* (2013.01)
(58) Field of Classification Search
 CPC ...................................................... G06T 15/06
 See application file for complete search history.

(56) References Cited

U.S. PATENT DOCUMENTS

| 5,341,462 | A | 8/1994 | Obata |
| 6,999,078 | B1 | 2/2006 | Akerman et al. |
| 8,207,968 | B1 | 6/2012 | Krishnaswamy et al. |
| 8,351,685 | B2 | 1/2013 | Ho et al. |
| 8,493,383 | B1 | 7/2013 | Cook et al. |
| 8,817,026 | B1 | 8/2014 | Zimmerman |
| 2005/0116951 | A1 | 6/2005 | Stephenson |
| 2005/0146522 | A1 | 7/2005 | Maillot |
| 2005/0286748 | A1 | 12/2005 | Yang et al. |
| 2008/0079731 | A1 | 4/2008 | Shearer |
| 2008/0170067 | A1 | 7/2008 | Kim et al. |

(Continued)

FOREIGN PATENT DOCUMENTS

EP        1183653 B1      3/2002

OTHER PUBLICATIONS

International Search Report to corresponding International Application No. PCT/US16/28590, dated Aug. 9, 2016, 3 pages.

(Continued)

*Primary Examiner* — Mark K Zimmerman
*Assistant Examiner* — Jonathan M Cofino
(74) *Attorney, Agent, or Firm* — James J. DeCarlo; Greenberg Traurig, LLP

(57) ABSTRACT

A rendering procedure determines that a voting process should be employed during non-geometric rendering when a wide range needs to be searched. During the voting process, a candidate point is initially identified along with a plurality of neighbors. The neighbors' real depth estimates and the deviations of their respective real depth estimates from the candidate point and votes for the real depth estimates are obtained. The minimum deviation among the deviations is identified. Other real depth estimate deviations are compared with the minimum deviation to identify if they lie in a predetermined deviation range. Based on the comparison of the other real depth estimate deviations with the minimum deviation the point to render the pixel is selected.

23 Claims, 10 Drawing Sheets

(56) References Cited

U.S. PATENT DOCUMENTS

| | | |
|---|---|---|
| 2009/0115784 A1 | 5/2009 | Tomite et al. |
| 2009/0254293 A1 | 10/2009 | Tartaglia et al. |
| 2010/0085357 A1 | 4/2010 | Sullivan et al. |
| 2010/0091016 A1 | 4/2010 | Kazar et al. |
| 2013/0002673 A1 | 1/2013 | Xue et al. |
| 2013/0060540 A1 | 3/2013 | Frahm et al. |
| 2013/0328880 A1 | 12/2013 | Mande et al. |
| 2014/0152647 A1 | 6/2014 | Tao et al. |
| 2014/0306959 A1 | 10/2014 | Ozdas et al. |
| 2015/0091904 A1 | 4/2015 | Lee et al. |
| 2015/0109292 A1 | 4/2015 | Lee et al. |
| 2015/0123971 A1 | 5/2015 | Lee et al. |
| 2015/0262408 A1 | 9/2015 | Lee et al. |

OTHER PUBLICATIONS

Written Opinion to corresponding International Application No. PCT/US16/28590, dated Aug. 9, 2016, 7 pages.

RENDERING VIA RAY-DEPTH FIELD INTERSECTION

CROSS REFERENCES TO RELATED APPLICATIONS

This application is a continuation of U.S. application Ser. No. 14/702,572, entitled "RENDERING VIA RAY-DEPTH FIELD INTERSECTION." the entirety of which is incorporated herein by reference.

BACKGROUND

The improvements in the hardware and software used on computers lead to rapid developments in the presentation of information. Visual, audio and haptic information can each be presented using its own appropriate hardware and associated software. Visual rendering is enabled by the developments in the field of computer graphics. Rendering can be based on geometric and non-geometric methods. Geometric surface rendering is based on the use of polygons, implicit and parametric surfaces and constructive solid geometry. Non-geometric (non-surface) rendering of objects includes the volumetric method and methods based on particle description. One technique used for non-geometric rendering is the ray-tracing method. In the ray-tracing technique, an image is generated by tracing the path of light through the pixels in an image plane. As the light rays are subject to laws of optics, they are altered due to reflections from surfaces that make up the virtual objects as well as transmissions through semi-transparent surfaces.

SUMMARY

This disclosure is related to systems and methods for rendering virtual objects. During non-geometric rendering a voting process is employed when the range of neighborhood to search is large. The voting process comprises, initially obtaining a candidate point based on the ray direction from the origin. A plurality of neighbors are identified for the candidate point and their real depth estimates or their candidate points for the ray intersection are obtained. The deviation of the real depth estimates from the initial candidate point are obtained. The minimum deviation among the deviations is identified and deviations of other real depth estimates are compared with the minimum deviation to determine if they lie within a predetermined deviation range of the minimum deviation. The point for rendering the pixel is selected based on the number of real depth estimates that lie within the predetermined deviation range of the minimum deviation.

A method of rendering a pixel is disclosed in accordance with some embodiments. The method comprises, receiving, by a processor, an upper bound and a lower bound for a neighborhood to search for a point to render a pixel and determining, by the processor, a range between the upper bound and the lower bound. If the range is equal to or greater than a range threshold, the processor executes a voting process for the identification of the point. Else, if below the threshold, the processor identifies the point for rendering the pixel via an iterative process that does not include the voting process.

In some embodiments, employing the voting process further comprises receiving, by the processor, a direction of a ray from an origin, an initial candidate point at which the ray will likely intersect a virtual object surface and a plurality of neighbors of the candidate point. The process further comprises obtaining, by the processor, respective real depth estimates for the intersection of the ray from each of the plurality of neighbors, respective votes for each of the real depth estimates and respective deviations of each of the real depth estimates from the candidate point. The real depth estimate with a minimum deviation is selected and it is determined if there are other real depth estimates that lie within a predetermined deviation range of the minimum deviation. For example, deviations of other real depth estimates can lie within 0.1 range of the minimum deviation.

If there are no real depth estimates that lie within the predetermined deviation range of the minimum deviation real depth, the real depth estimate with the minimum deviation is selected by the processor as the point for rendering the pixel. If other real depth estimates exist within the deviation range of the minimum deviation real depth, then votes of the other real depth estimates and the minimum deviation real depth estimate are counted and a real depth estimate with the maximum number of votes is selected by the processor for rendering the pixel.

A computing apparatus comprising a processor and a non-transitory processor readable storage medium comprising programming logic is disclosed in one embodiment. In some embodiments, the programming logic comprises range receiving logic that receives an upper bound and a lower bound for a neighborhood to search for a point to render a pixel, range determining logic that determines a range between the upper bound and the lower bound and point identifying logic that employs a voting process for the identification of the point if the range is greater than a range threshold, else, identifies the point for rendering the pixel via an iterative process that does not comprise the voting process.

In some embodiments, the point identifying logic further comprises ray receiving logic that receives a direction of a ray from an origin, an initial candidate point at which the ray will likely intersect a virtual object surface and a plurality of neighbors of the candidate point. In some embodiments, the programming logic for the point identifying logic further comprises real depth obtaining logic that obtains respective real depth estimates for the intersection of the ray from each of the plurality of neighbors, vote receiving logic that receives votes for the real depth estimates from each of the neighbors other than the neighbor providing the real depth estimate and deviation determining logic that determines respective deviations of each of the real depth estimates from the candidate point.

In some embodiments, the point identifying logic further comprises minimum deviation logic that selects one of the real depth estimates with a minimum deviation and logic for determining if deviations of the real depth estimates other than the selected real depth estimate are within a predetermined range of the selected real depth estimate. In some embodiments, the point identifying logic further comprises estimate identifying logic that identifies the selected real depth estimate as the point for rendering the pixel if none of the other real depth estimates are within the predetermined range.

In some embodiments, the point identifying logic further comprises estimate identifying logic that identifies the other real depth estimates that are within the predetermined range of the selected real depth estimate, vote counting logic that obtains a number of votes for each of the other real depth estimates that are within the predetermined range of the selected real depth estimate and real depth identifying logic that identifies the real depth estimate with a maximum number of votes for rendering the pixel.

Non-transitory computer-readable storage medium comprising processor-executable instructions is disclosed in one embodiment. The medium comprises instructions for receiving an upper bound and a lower bound for a neighborhood to search for a point to render a pixel, determining a range between the upper bound and the lower bound and employing a voting process for the identification of the point if the range is greater than a range threshold. The medium further comprises instructions for identifying the point for rendering the pixel via an iterative process that does not comprise the voting process if the range is below a range threshold. In some embodiments, the instructions for employing the voting process further comprise instructions for receiving a direction of a ray from an origin, an initial candidate point at which the ray will likely intersect a virtual object surface and a plurality of neighbors of the candidate point.

In some embodiments, the instructions for employing the voting process further comprise instructions for obtaining respective real depth estimates for the intersection of the ray from each of the plurality of neighbors, determining respective deviations of each of the real depth estimates from the initial candidate point, selecting one of the real depth estimates with a minimum deviation and determining if deviations of the real depth estimates other than the selected real depth estimate are within a predetermined range of the selected real depth estimate. If none of the other real depth estimates are within the predetermined range the computer readable medium comprises further instructions for selecting the at least one real depth estimate as the point for rendering the pixel. In some embodiments, if one or more of the other real depth estimates are within the predetermined range, then the medium further comprises instructions for identifying such other real depth estimates that are within the predetermined range of the real depth estimate with the minimum deviation, obtaining a number of votes for each of the other real depth estimates that are within the predetermined range of the selected real depth estimate and selecting the real depth estimate with a maximum number of votes for rendering the pixel.

In some embodiments, if the range is greater than a range threshold, the medium comprises instructions for employing an iterative process. The instructions for the iterative process comprise instructions for calculating an interpolation point from the real depth estimates and employing the interpolation point as a new candidate point in a next iteration.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
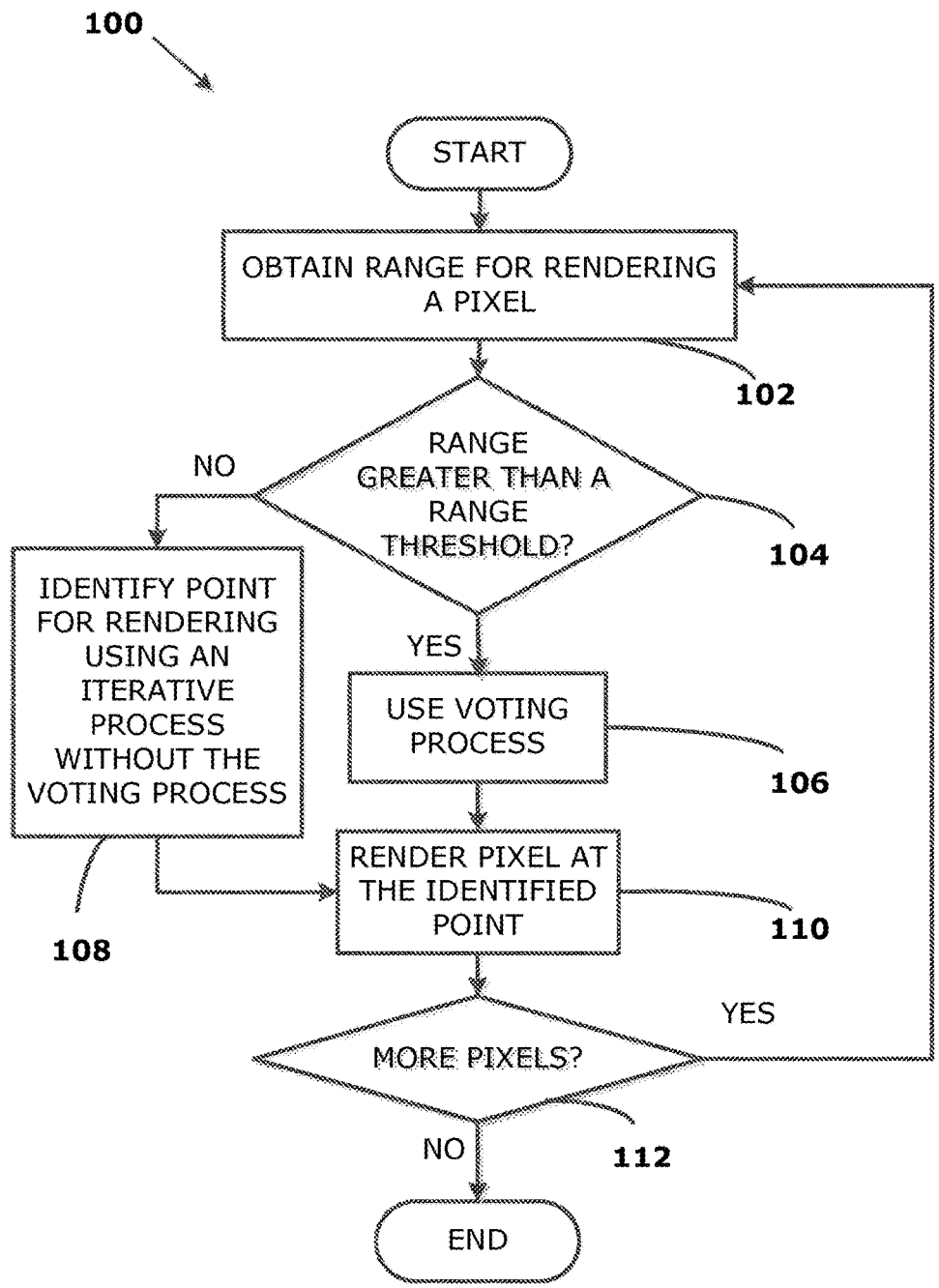
FIG. 1 is a flowchart that details a rendering process in accordance with embodiments described herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Ray tracing starts with a few basic elements: a three-dimensional scene lit by one or more light sources, a viewing screen comprising an array of pixel elements (a window onto the scene), and a hypothetical viewing eye which looks out on the scene through the viewing screen. The goal of any image synthesis technique is to correctly color each pixel of the viewing screen such that looking at the screen from the vantage of the hypothetical eye would recreate the original three-dimensional scene as closely as possible.

As generally implemented, ray tracing is backward ray tracing, whereby a backward-going ray from the hypothetical viewing eye passes through a pixel on the viewing screen and strikes an object within the scene to be rendered. By working backwards, a rendering algorithm essentially determines the point on a surface where a light ray has struck and then determines from where the light ray originated. Having found the first surface which the backward ray struck, the rendering algorithm determines all light striking that point on that surface and how the incident light is affected by the particular surface characteristics of the struck object. The combined light illumination of the object can be passed back along the original ray through the particular pixel into the viewer's eye, allowing the pixel to be appropriately shaded. Of course, the different intensities, directions, colors and origins of the light striking the point on the object's surface is infinite; path tracing seeks to sample the light coming from different sources efficiently so that a few samples can replace exhaustively looking at all light rays, while still recovering enough useful information to construct a close estimate of the scene's photometry.

A video frame is a rendered representation of a scene or environment from a given spatial location in the environment and according to one or more view transform parameters (such as translation, pitch, yaw, and field of view). A video sequence can be generated by successively generating video frames from objects such as layered cube maps according to a set of render instructions. A given video frame can be rendered by using a pixel or fragment shader to generate pixel values for the frame. To render a scene, a fragment shader computes the distance between the spatial location corresponding to a video frame and an object defined in the layer(s) of the environment map along a set of rays extending from the spatial location of the video frame. Since the spatial location of the video frame and the reference point of the cube map are often different, a search algorithm is used to find the distance for rendering of a given pixel in the virtual environment.

In some embodiments, a two-phased search algorithm can be used. In a first phase, a linear search algorithm can compute a rough overshooting guess and an undershooting approximation that bound the intersection point of the ray. A second search process, bounded by the overshooting and undershooting values, searches for a more accurate intersection point. If the range between the overshooting and undershooting values is large, the search algorithm fails as the second phase can be rather inefficient in terms of the time it takes to locate the more accurate intersection point.

Embodiments are disclosed so that when the range between the overshooting and undershooting values is large, the second phase of the search procedure for locating the intersection point at which the pixel is to be rendered is improved via a voting process. FIG. 1 is a flowchart 100 that details a method of executing a rendering process in accordance with some embodiments. The method begins at 102 wherein the range of the neighborhood which has to be searched for identifying a pixel-rendering point is received. As described herein, some known procedures can be implemented to initially identify the range which can comprise the overshooting and undershooting values or the upper and lower bounds of the neighborhood. At 104, the range can be compared to a neighborhood threshold in order to determine if a voting process should be adopted for rendering the pixel. If it is determined at 104 that the received range is above the range threshold, the method proceeds to 106 to implement the voting procedure in accordance embodiments described further herein. If it is determined at 104 that the received range is not above the range threshold (equal to or less than), the voting procedure need not be implemented. Instead, the pixel can be rendered by using iteration method at 108. In some embodiments, other search procedures, such as, secant search can also be used. The method proceeds to 110 wherein the pixel is rendered at the identified point.

Further processing comprises determining if there are other pixels to be rendered as shown at 112. If yes, the method returns to 102 to fetch a new pixel to be rendered and goes to 104 for selecting the next range to determine if the voting process needs to be implemented. The voting procedure outlined herein can thus be implemented on a pixel-by-pixel basis, wherein for any pixel whose neighborhood range is greater than a predetermined range threshold, implementing the voting procedure can enhance the efficiency of the rendering process. Although the process is depicted herein as being implemented serially pixel-by-pixel, it can be appreciated that this is only for the purpose of illustration.

In some embodiments, the process can be implemented in parallel for all the pixels simultaneously.

Figure 2A:
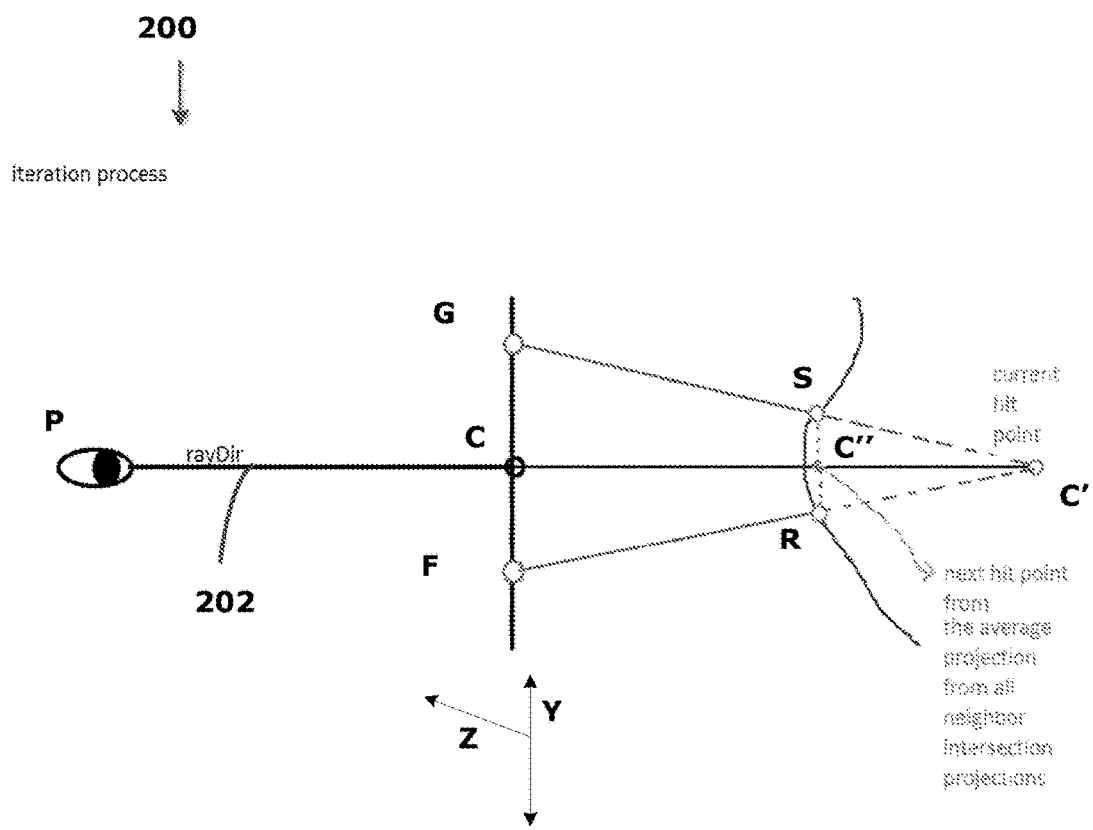
FIGS. 2A, 2B and 2C are schematic diagrams showing the rendering of a pixel in accordance with embodiments described herein.

FIG. 2A is a schematic diagram of the rendering procedure that implements an iteration process in accordance with embodiments described herein. Let P be the position of the hypothetical eye or the hypothetical camera from where the ray 202 is traced. Based on the direction of the ray 202, an end point C is determined to be the point of intersection for the ray 202 originating at P and terminating on a plane that comprises a plurality of neighbors with c' as another reference point on the ray 202. Two of the neighbors G and F are shown. In addition a real depth estimate or an initial candidate point (not shown) for the ray 202 at which a pixel is to be rendered is obtained. Although only two neighbors G and F are shown for the ease of illustration, up to four neighbors can be selected in accordance with some embodiments. For example, in addition to G and F which lie along Y axis, two other neighbors including a first neighbor corresponding to G and a second neighbor corresponding to F lying inside the plane of the paper along Z axis can be employed for the iteration process. The neighbors can be selected in different directions to minimize error while optimizing the calculations. However, it can be appreciated that any number of neighbors based on different distance and/or angular criteria can be selected in accordance with embodiments described herein.

Real depth estimates or candidate points of the plurality of neighbors for the ray 202 are obtained. For example, if the real depth estimates R and S of neighbors G and F for the ray 202 are obtained and their projections SC" and RC" on the ray 202 are determined. As the projections of the real depth estimates G and F on the ray 202 substantially coincide at C", the deviation of their real depth estimations is minimal and less than a predetermined threshold. Accordingly, a voting process is not instituted and instead an iterative process is used. If C" is selected during the iterative process, the color information can be obtained from the neighbors G and F, and the pixel is rendered at C" with the average color from all the neighbors.

Figure 2B:
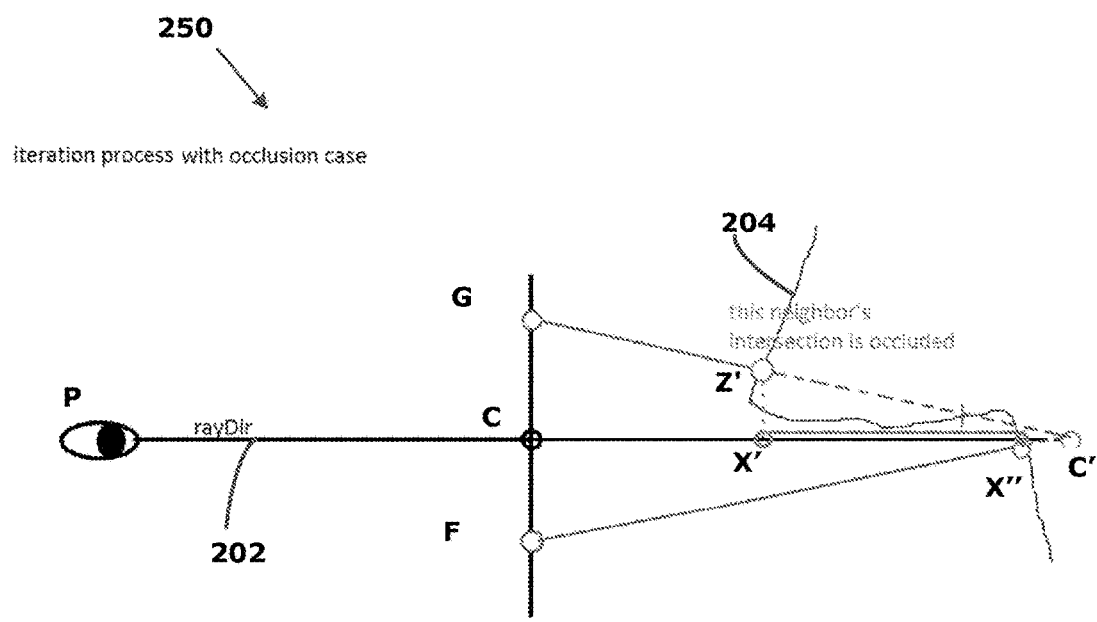

FIG. 2B is a schematic diagram 250 that illustrates an iterative process for an occlusion case in accordance with some embodiments herein. This is similar to the case shown in the illustration 200, except that the projections X' of neighbor G and X" of neighbor F on the ray 202 show significant divergence. This is because the projection X' of G's intersection with the ray 202 is occluded by a virtual object surface 204, which can be the surface of a virtual object that is already rendered. However, as seen from FIG. 2B, the projection of X" of F is not occluded. In this case, if the deviation of X' and X" exceeds a predetermined range threshold, a voting process can be triggered in accordance with embodiments herein as results from the iteration process in the occlusion case are not reliable.

Figure 2C:
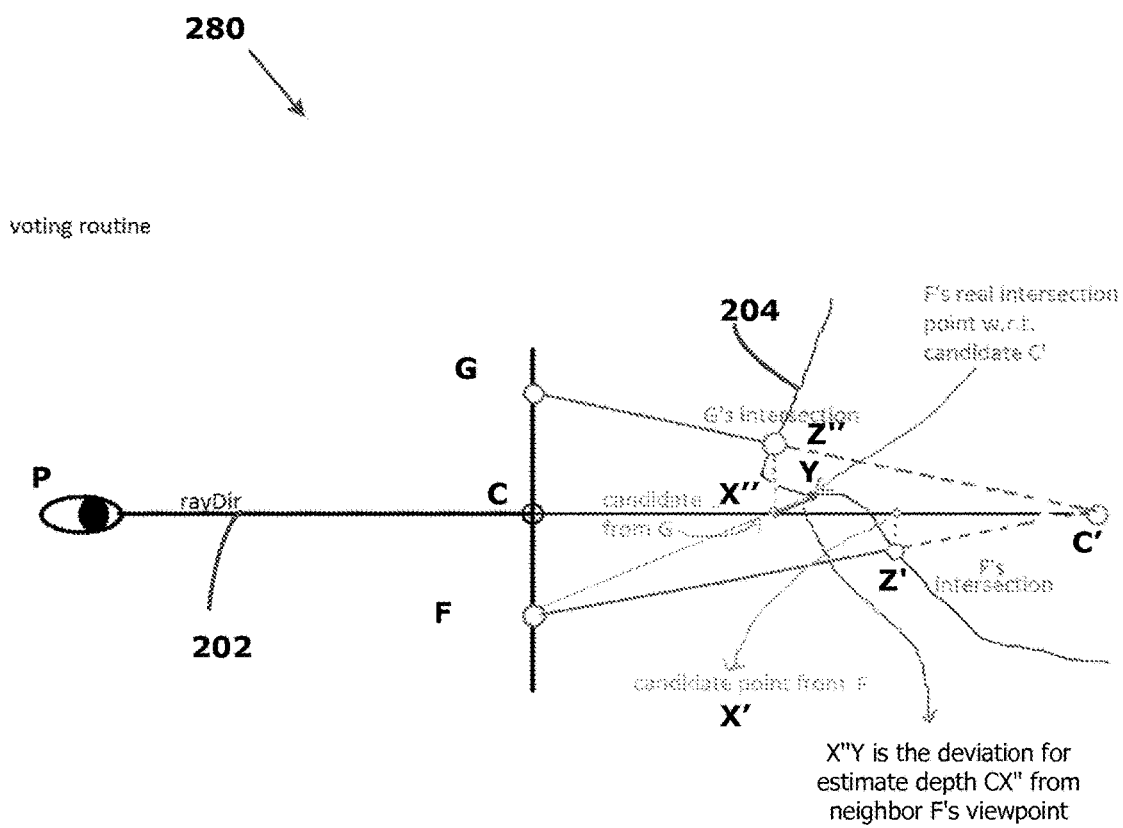

FIG. 2C is a schematic diagram 280 that illustrates the voting process in accordance with some embodiments herein. The description of elements which are similar to the case shown in the illustrations 200, 250 is omitted for brevity. G's intersection point Z" with the virtual object surface 204 when projected on to the ray 202 meets the ray 202 at X" which can be G's candidate point or G's real depth estimate. Similarly when F's intersection point Z' with the object surface 204 when projected on to the ray 202 meets the ray 202 at X" which can be F's candidate point or F's real depth estimate. However, Y is F's real intersection point with the object surface 204 in the direction of FX".

As seen from the figure, the deviation between Y and X" (G's intersection point) is very small. If this deviation is compared to a predetermined deviation range and is determined to be within the predetermined deviation range, a voting process is executed. During the voting process, the votes associated with respective candidate points X' and X" of G and F are counted. A single vote is added to the candidate point for each neighbor that is not occluded from the candidate point. Among the two close real depth points X" and X', the point that is not occluded from the most neighbors will have greater number of votes and hence will be selected for rendering the pixel. If both the points X" and X' have an equal number of votes, then the candidate point with the minimum deviation from the initial candidate point can be selected in accordance with some embodiments.

Figure 3:
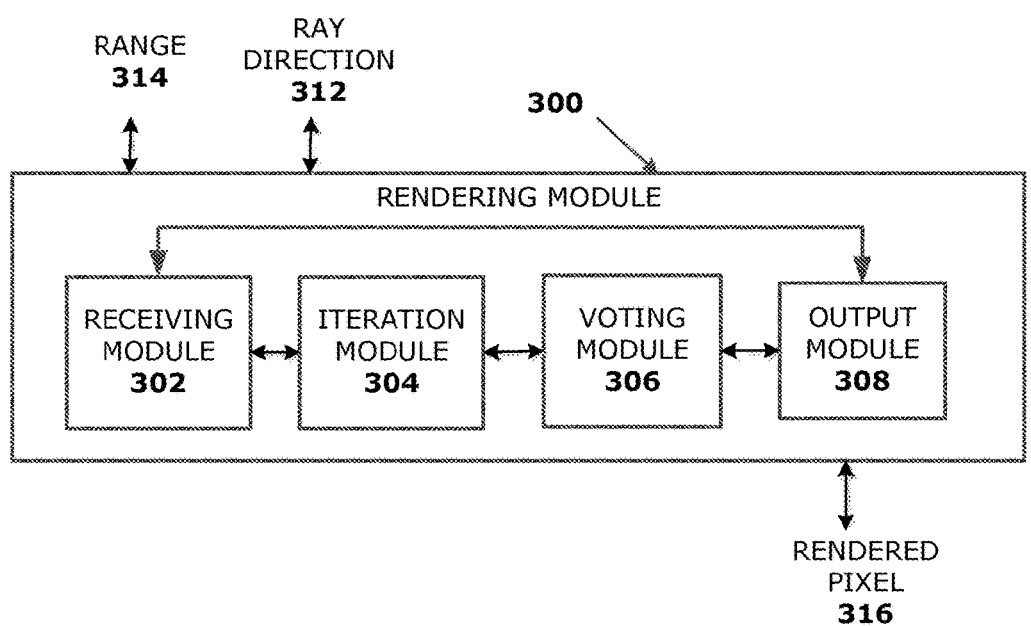
FIG. 3 is a schematic diagram showing a rendering module in accordance with some embodiments.

FIG. 3 is a schematic diagram of a rendering module 300 that implements non-geometric rendering of virtual, visual objects via techniques such as but not limited to ray-tracing in accordance with embodiments described herein. Various kinds of objects including 2D (two-dimensional) and 3D (three dimensional) objects can be rendered. The rendering module 300 comprises a receiving module 302, an iteration module 304, a voting module 304 and an output module 306. The receiving module 202 receives as input, the direction of the ray to be traced 312 and the range 314 of neighborhood to be searched. For example, the receiving module 302 can receive the overshooting and undershooting values in the range information 314 to determine if an iteration procedure or a voting process needs to be conducted to identify the location at which a particular pixel associated with the ray is to be rendered.

In some embodiments, the receiving module 302 can be further configured to compare the range 314 with a predetermined threshold. If the range is within a predetermined threshold, then the iteration module 304 can be used to identify the point for rendering the pixel. Accordingly, the receiving module 302 can transmit the ray direction 312 and the range 314 information to the iteration module 304 in order to determine a candidate point at which the pixel should be rendered. The iteration module 304 can be configured to iterate over neighboring points to obtain their real depth estimates. Based on the deviation of the real depth estimates from the initial candidate point, one of the real depth estimates can be used to render the pixel. Else, the iterative process obtains an average of the real depth estimates to be used for the next iteration. The iterations proceed until a real depth estimate with a deviation that is small enough to satisfy certain conditions (for example, a deviation threshold) is generated.

If the range 314 of the overshooting and undershooting values is larger than the predetermined threshold, the receiving module 302 can be configured to determine that a voting procedure is required and accordingly the information regarding the ray direction 312, an initial candidate point and the range 314 is transmitted to the voting module 306. The voting module 306 can be configured to select the neighbors G, F for the candidate point, obtain their real depth estimates. One of the estimates with the least or minimum deviation can be selected as the real depth for rendering the pixel in some embodiments.

In some embodiments, two or more real depth estimates can be very close together. For example, the deviation of another real depth estimate from the candidate point can be very close to the deviation of the minimum deviation real depth estimate. In this case, the votes associated with both the real depth estimates are counted. One of the real depth estimates with the greater number of votes is selected as the real depth for rendering the pixel. The selected real depth is projected onto the ray 202 to determine the intersection point. Upon the intersection point being determined, the color of that point can be obtained from valid neighbors for the average color to be rendered. The information regarding this finalized rendering point is obtained by the output module 106 which renders the pixel the point 316.

Figure 4:
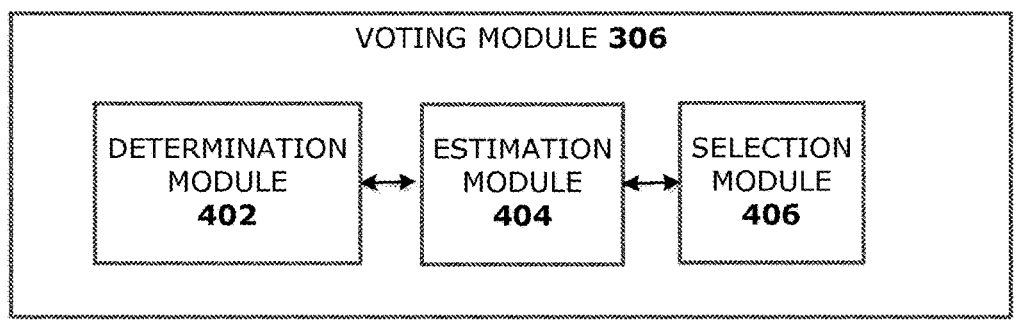
FIG. 4 is a block diagram showing the sub-modules of a voting module in accordance with some embodiments.

FIG. 4 is a schematic diagram showing the sub modules of the voting module 306 in accordance with some embodiments. The voting module 306 further comprises a determination module 402, an estimation module 404 and a selection module 406. The determination module 402 receives information regarding the ray direction 312 and the origin P and determines an initial candidate point C. Various methods such as but not limited to ray tracing, which are known in the art or methods that are to be invented can be used in accordance with embodiments described herein to determine an initial candidate point for rendering the pixel in the virtual space relative to the origin P. The determination module 402 further determines a plurality of neighbors F, G for the initial candidate point. In some embodiments, the neighbors are the closest neighbors of the initial candidate point. In some embodiments, the plurality of neighbors can be coplanar and equidistant from the candidate point C.

The estimation module 404 receives information regarding the candidate point C and obtains a current hit point C'. In addition, the estimation module 404 also receives information regarding the neighbors, F, G and obtains their real depth estimates X' and X". In addition, the estimation module 404 also generates votes for the real depth estimates X' and X". A real depth estimate receives a single vote for each neighbor from which the real depth estimate is not occluded. The information regarding the real depth estimates and their respective votes is transmitted to the selection module 406 which further processes this information to identify the point at which the pixels should be rendered.

The selection module 406 receives the real depth estimates of the neighbors X' and X" and determines their deviation from the initial candidate point. In some embodiments, the deviations of the neighbors' candidate points X' and X" from the initial candidate point are determined. A single real depth estimate with minimum deviation can be selected for rendering the pixel in some embodiments. In some embodiments, one or more other real depth estimates can be within a predetermined deviation range of the minimum deviation threshold. In this case, the votes associated with the minimum deviation threshold and the other real depth estimates are counted. The real depth estimate with greater votes (which implies that it is not occluded from a more neighbors) is selected for rendering the pixel.

Figure 5:
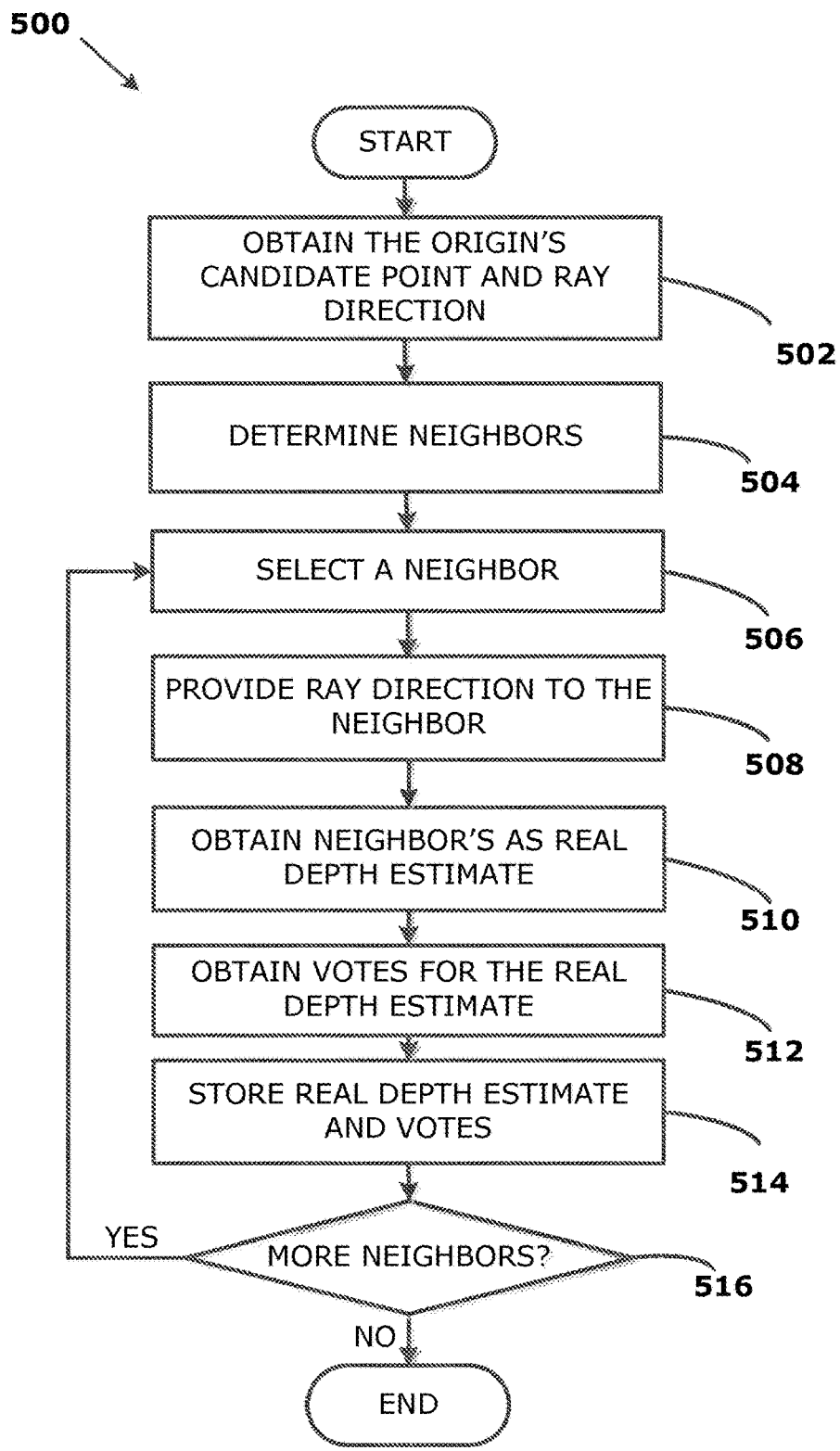
FIG. 5 is a flowchart that details a method of obtaining the real depth estimates from the neighbors in accordance with some embodiments.

FIG. 5 is a flowchart 500 that details a method of obtaining the real depth estimates and their votes from the neighbors in accordance with some embodiments. The method begins at 502 wherein the ray direction and the initial candidate point are obtained. A plurality of neighbors of the candidate point are selected at 504. In some embodiments, coplanar, closest neighbors that are equidistant from the initial candidate point can be selected. One of the neighbors is selected for the further processing at 506.

Accordingly, at 508 information regarding the ray direction 212 is retrieved and the neighbor's estimate for the real depth is received at 510. In addition, the votes from other neighbors of the plurality of neighbors for the real depth estimate are received at 512. A single vote is added for each neighbor point from which the real depth estimate is not occluded. The value of the estimated real depth and its respective votes is stored at 514. At 516, it is determined if more neighbors remain whose estimates of real depths need to be recorded. If yes, the method returns to step 506 wherein the next neighbor is selected. Thus, the estimated real depths and their votes are obtained and recorded for each neighbor. Although it is shown that the neighbors are processed serially in this flowchart this is only by the way of illustration and not limitation. It can be appreciated that the processing powers of the current GPU hardware permits parallel processing all the neighbors simultaneously.

Figure 6:
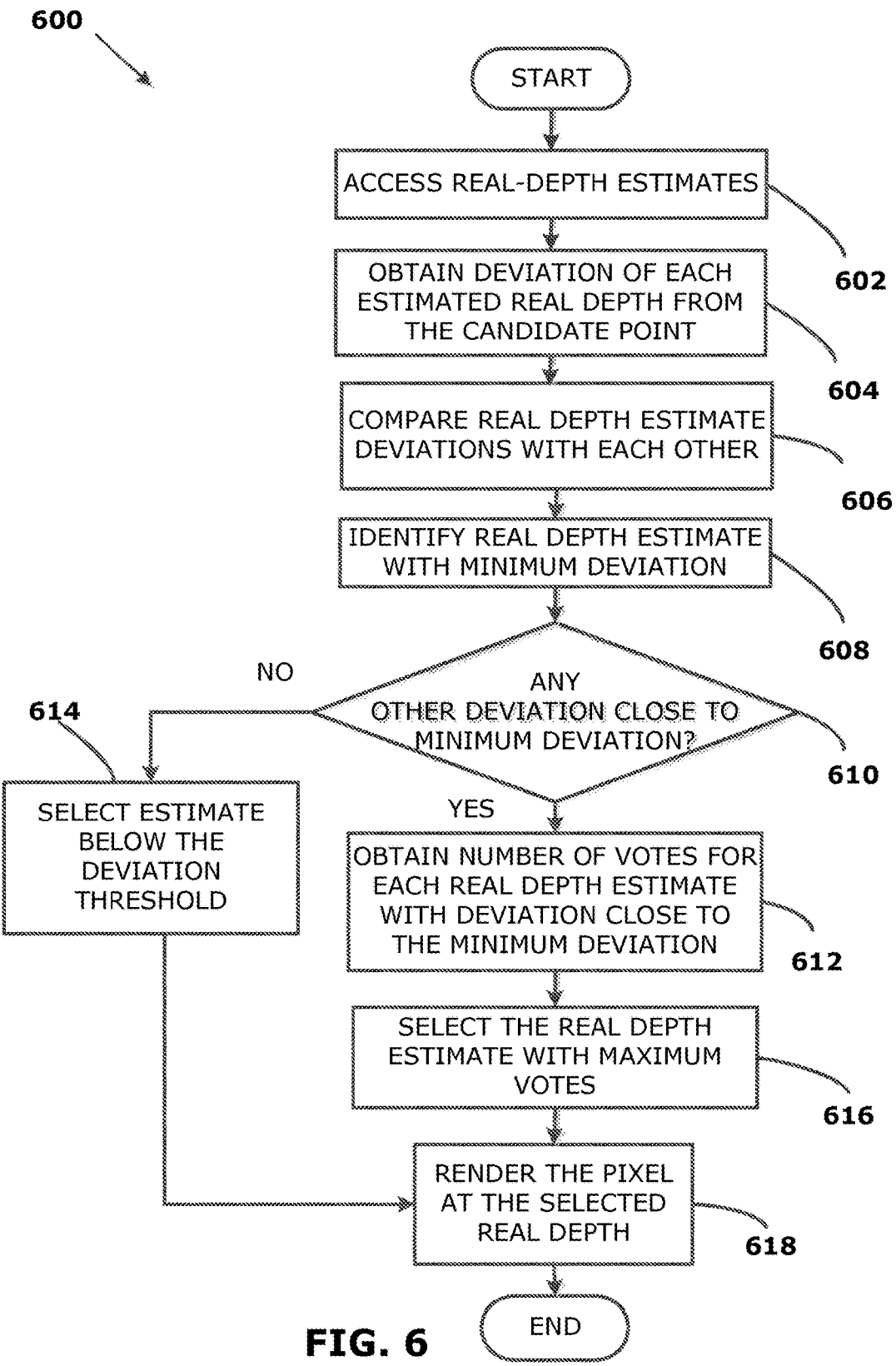
FIG. 6 is a flowchart that details a method of selecting a point for rendering a pixel in accordance with some embodiments.

FIG. 6 is a flowchart 600 that details a method of selecting a point for rendering a pixel in accordance with some embodiments. The method begins at 602 wherein the stored real depth estimates are accessed. The difference or deviation of each of the real depth estimates from the initial candidate point is determined at 604. The deviations or differences are compared to each other at 606 and the depth estimate with a minimum deviation is identified at 608.

At 610 it is determined if other real depth estimates exist that have deviations close to the minimum deviation, for example, within a predetermined deviation range. If it is determined at 610 that there is no other real depth estimate that has a deviation close to the minimum deviation, then that real depth estimate with the minimum deviation is selected at 614. The pixel is rendered at the selected real depth as shown at 618 and the process terminates.

If it is determined at 610 that there are one or more real depth estimates with their respective deviations from the candidate point within a predetermined deviation range and close to the minimum deviation, the method proceeds to 612. At 612, the number of votes associated with each of the real depth estimates within the predetermined deviation range is obtained. At 616, a real depth estimate with most votes is selected and the pixel is rendered at the selected real depth estimate as shown at 618 and the procedure terminates. By the way of illustration and not limitation, the predetermined deviation range can be within 0.1. In some embodiments, the predetermined deviation range can be empirically determined.

Figure 7:
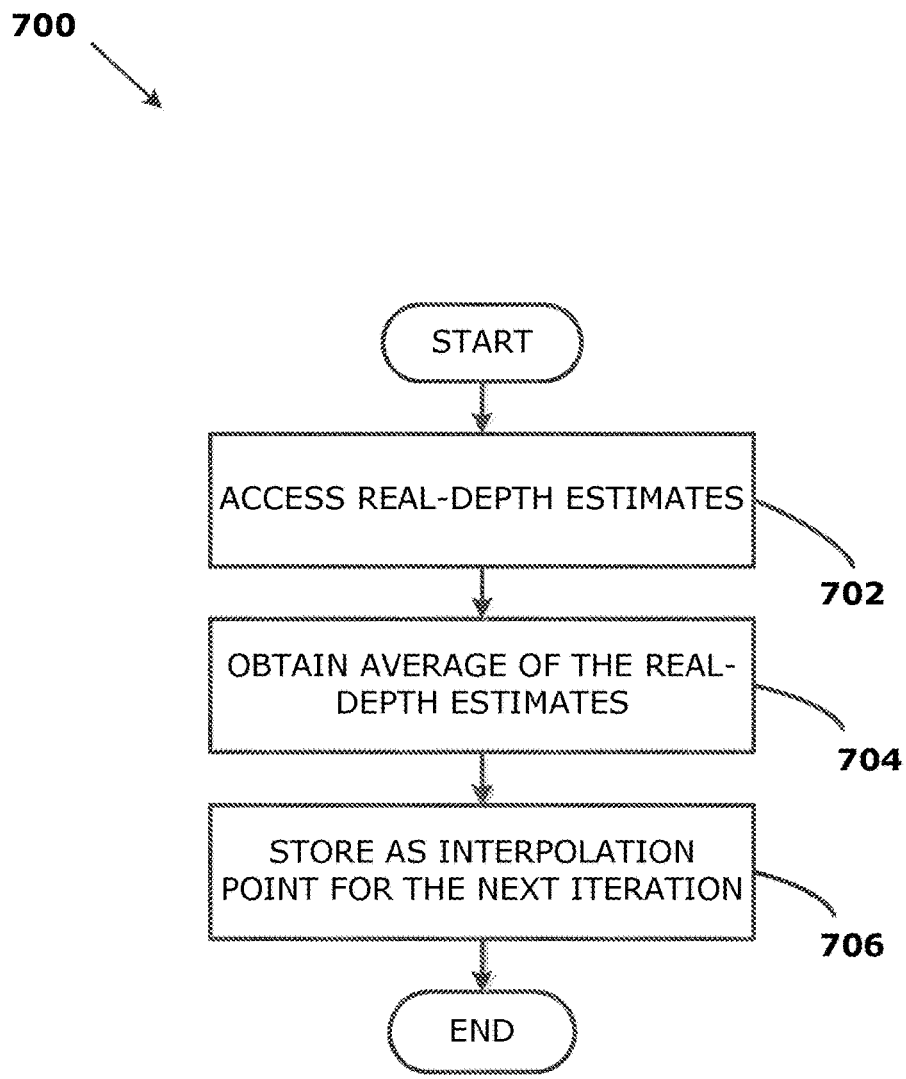
FIG. 7 is a flowchart that details a method of generating an interpolation point in accordance with embodiments described herein.

FIG. 7 is a flowchart 700 that details a method of generating an interpolation point for use during the iterative process in accordance with embodiments described herein. The method begins at 702 wherein the real depth estimates that are recorded for the plurality of neighbors are accessed. At 704 the average real depth estimate is obtained. It can be appreciated that if an occlusion cases exists wherein the real depth estimate has a large deviation from the initial candidate point. The average real depth estimate is recorded at 706 as the interpolation point to be used in the next iteration for narrowing the search.

Figure 8:
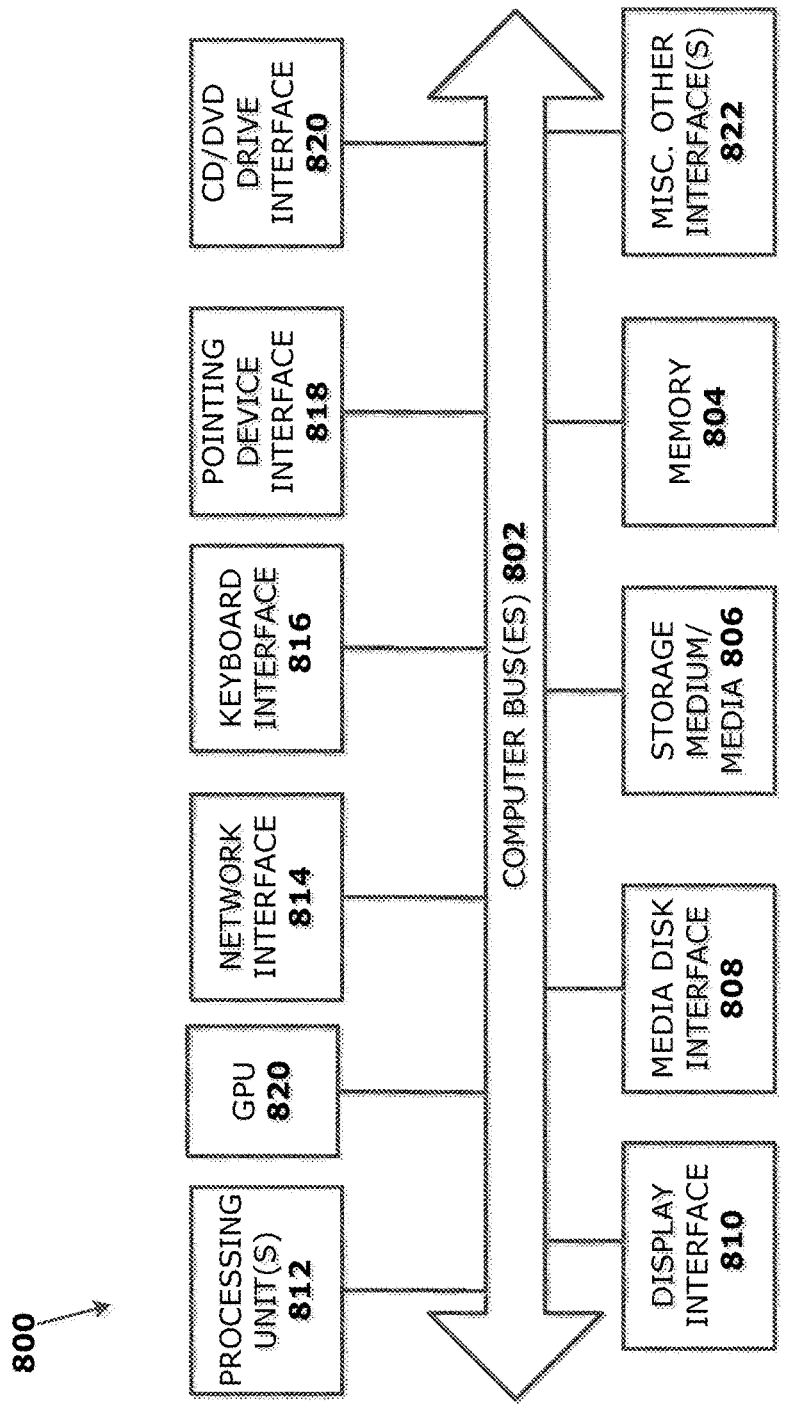
FIG. 8 is a schematic diagram of the internal architecture of a computing device in accordance with embodiments described herein.

FIG. 8 is a schematic diagram of the internal architecture of a computing device 800 in accordance with embodiments described herein. The computing device 800 can be employed as a rendering device with the render module 200 comprising the voting module 204 stored in its memory. The computing device 800 can render graphics such as but not limited to 2D and 3D images in accordance with embodiments described herein. In an embodiment, the computing device 800 includes one or more processing units (also referred to herein as CPUs) 812, which interface with at least one computer bus 802. In some embodiments, computing device 800 can comprise a GPU (Graphics Processing Unit) which comprises one or more integrated circuits and/or processing cores that are directed to mathematical operations commonly used in graphics rendering. In some implementations, the GPU 820 may use a special graphics unit instruction set, while in other implementations, the GPU may use a CPU-like (e.g. a modified x86) instruction set. Graphics processing unit 820 can implement a number of graphics primitive operations, such as blitting, texture mapping, pixel shading, frame buffering, and the like. Graphics processing unit 820 may be a graphics accelerator, a GPGPU (General Purpose GPU), or any other suitable processing unit.

Also interfacing with computer bus 802 are persistent storage medium/media 806, network interface 814, memory 804, e.g., random access memory (RAM), run-time transient memory, read only memory (ROM), etc., media disk drive interface 808, an interface 820 for a drive that can read and/or write to media including removable media such as floppy, CD-ROM, DVD, etc., media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code or logic, and/or computer-executable process steps, incorporating functionality described herein, e.g., one or more of process flows described herein. CPU 812 first loads computer-executable process steps or logic from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps. In some embodiments, the stored data can comprise content objects. A content data object or a content object, in particular implementations, is an individual item of digital information typically stored or embodied in a data file, binary large object (BLOB) or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, metadata, playlists and other files. Persistent storage medium/media 906 can further include program modules/program logic in accordance with embodiments described herein and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

TABLE I below shows a non-limiting example of the pseudo code for the voting process in accordance with an embodiment.

```
const float DEPTH_DIFF_THRESHOLD = 50.f;
const float OCCLUSION_DEPTH_THRESHOLD = 0.15f;
/** Voting process
    param[in]     neighbors[4]       4 neighbor locations
    param[in]     candidatePoint     candidate point location
    param[out]    candidateDiff      Sum of total diffs that neighbors give to the candidate point
    param[out]    candidateOccluded[4] Occlusion indicator for this candidate point w.r.t. all the neighbors
    param[out]    candidateVotes     total votes from all neighbors for this candidate point
*/
void doVoting(neighbors[4], candidatePoint, candidateDiff, candidateOccluded, candidateVotes)
{
             // initialize all the output data
             candidateDiff = 0.f;
             candidateOccluded = {false}
             candidateVotes = 0;
             // go thru all the neighbors
             for (int cntNeighbor = 0; cntNeighbor < 4; cntNeighbor++)
             {
                 // find the vector from the current neighbor to the candidate point
                 neighborRayDir = normalize(candidatePoint − neighbors[cntNeighbor]);
                 // find the length from the current neighbor to the candidate point
                 neighborDepth = length(candidatePoint − neighbors[cntNeighbor]);
                 // find the length from the current neighbor to the intersection point by using the vector "neighborRayDir"
                 realDepth = Lookup(neighbors[cntNeighbor], neighborRayDir);
                 // if the neighborDepth is too much greater than realDepth, that means the candidate point is occluded from the current neighbor with some object in front of candidate point
                 if (neighborDepth − realDepth > OCCLUSION_DEPTH_THRESHOLD)
                 {
                       candidateOccluded[cntNeighbor] = true;
                 }
                 // if no occlusion, we add up the length diff and add 1 to the candidateVotes
                 else
                 {
                       candidateDiff += abs(neighborDepth − realDepth);
                       candidateVotes++;
                 }
             }
}
/** depth field intersection test with voting process
    param[in]     rayO          ray origin
    param[in]     rayDir        normalize ray direction
    param[in]     rayEnd        ray end on the surface where those neighbors locate on
    param[in]     neighbors[4]  the 4 closest neighbor surrounding "rayEnd"
    param[out]    rayNewEnd     ray new end will be the estimated intersection point that we will find
*/
void depth_field_intersect_voting(rayO, rayDir, rayEnd, neighbors[4], rayNewEnd)
{
             // initialize some data
             neighborDiffs[4] = {0.0}
             neighborOccluded[4] = {false}
             neighborVotes[4] = {0}
             candidatePnts[4]
             // go thru all neighbors and do voting
             for (int cntNeighbor = 0; cntNeighbor < 4; cntNeighbor++)
             {
                 // use the ray direction to find the estimate depth from the current neighbor
                 realDepth = Lookup(neighbors[cntNeighbor], rayDir);
                 // we use the estimate depth to find the candidate point extended on rayO −> rayEnd
                 candidatePnts[cntNeighbor] = rayEnd + realDepth * rayDir;
                 // run voting process for this candidate point
                 doVoting(neighbors, candidatePnts[cntNeighbor], neighborDiffs[cntNeighbor], neighborOccluded[cntNeighbor], neighborVotes[cntNeighbor]);
             }
             // choose the minimum diff from neighborDiffs
             minIndex = 0;
             minDiff = MAX_FLOAT;
             maxVotes = 0;
             for (int i = 0; i < 4; i++)
```

```
                {
                        if (neighborDiffs[i] < minDiff)
                        {
                                minDiff = neighborDiffs[i];
                                minIndex = i;
                                maxVotes = neighborVotes[i];
                        }
                }
                // if any other diff is similar to minDiff, we compare the votes and choose the
max
votes
                minIndexRecord = minIndex;
                for (int i = 0; i < 4; i++)
                {
                        if (i != minIndexRecord && neighborDiffs[i] – minDiff < 0.1 &&
neighborVotes[i] > maxVotes)
                        {
                                maxVotes = neighborVotes[i];
                                minIndex = i;
                        }
                }
                rayNewEnd = candidatePnts[minIndex]
}
/** depth field intersection test with iteration method first, if it doesn't pass some test, we will
switch to voting method
                param[in]        rayO         ray origin
                param[in]        rayDir       normalize ray direction
                param[in]        rayEnd       ray end on the surface where those neighbors locate
on
                param[in]        neighbors[4] the 4 closest neighbor surrounding "rayEnd"
                param[out]       rayNewEnd    ray new end will be the estimated
intersection point that we will find
*/
void depth_field_intersect_hybrid(rayO, rayDir, rayEnd, neighbors[4], rayNewEnd)
{
                // initialize some values
                MAX_ITERATION = 5;
                rayDepth = 1000.f;
                bool4 occluded = bool4(false, false, false, false);
                // Run for each iteration
                for (int cntIter = 0; cntIter < MAX_ITERATION; cntIter++)
                {
                        // current hit point for this iteration (we will be updating rayDepth at each
iteration)
                        currentHitPnt = rayEnd + rayDepth * rayDir;
                        // this is for the next round rayDepth
                        currentDepth = 0.f;
                        // for recording the max and min depth values
                        minDepth = MAX_FLOAT;
                        maxDepth = 0.f;
                        // interpolote depth values from all neighbors
                        for (int cntNeighbor = 0; cntNeighbor < 4; cntNeighbor++)
                        {
                                // the normalized direction from the neighbor to the current hit
point
                                neighborRayDir = normalize(currentHitPnt –
neighbors[cntNeighbor]);
                                // the length from the current neighbor to the current hit point
                                neighborDepth = length(currentHitPnt – neighbors[cntNeighbor]);
                                // the length(depth) that the current neighbor have by referring the
direction "neighborRayDir"
                                realDepth = Lookup(neighbors[cntNeighbor], neighborRayDir);
                                // record the min depth
                                if (realDepth < minDepth)
                                {
                                        minDepth = realDepth;
                                }
                                // record the max depth
                                if (realDepth > maxDepth)
                                {
                                        maxDepth = realDepth;
                                }
                                // check if any occlusion is happening after 2nd iteration
                                if (cntIter > 2 && neighborDepth – realDepth >
OCCLUSION_DEPTH_THRESHOLD)
                                {
                                        occluded[cntNeighbor] = true;
                                        continue;
                                }
```

```
                              // we project the neighbor's depth onto vector "rayDir" and add it
up for the next iteration
                              float projectedDepth = dot(rayDir, realDepth *
normalize(currentHitPnt – neighbors[cntNeighbor]));
                              float neighborWeighting = ...; // neighbor's weighting is usually
based on the distance between it and rayEnd
                              currentDepth += neighborWeighting * projectedDepth;
                        }
                        // if the diff between maxDepth and minDepth is over some threshold, we
will switch to the voting routine
                        if (maxDepth – minDepth > DEPTH_DIFF_THRESHOLD)
                        {
                              return depth_field_intersect_voting(rayO, rayDir, rayEnd,
neighbors, retColor, retDepth);
                        }
                        // make rayDepth to be the recorded currentDepth for the next iteration
                        rayDepth = currentDepth;
                  }
                  // output the rayNewEnd
                  rayNewEnd = rayEnd + rayDepth * rayDir;
}
```

What is claimed is:

1. A method implemented by a processor of a computing device, comprising:
receiving an upper bound and a lower bound for a neighborhood of rendering points to search for a rendering point to visibly render a pixel on a display device;
determining a range between the upper bound and the lower bound;
employing a voting process for the identification of the rendering point if the range is greater than a range threshold;
if the range not greater than the range threshold, identifying the rendering point via an iterative process that does not comprise the voting process; and
rendering the pixel at the identified rendering point.

2. The method of claim 1, wherein employing the voting process further comprises:
receiving a direction of a ray from an origin, an initial candidate point at which the ray will likely intersect a virtual object surface and a plurality of neighbors of the candidate point.

3. The method of claim 2, further comprising:
obtaining respective real depth estimates for the intersection of the ray from each of the plurality of neighbors, votes for the real depth estimates from each of the neighbors other than the neighbor providing the real depth estimate and respective deviations of each of the real depth estimates from the initial candidate point;
selecting one of the real depth estimates with a minimum deviation; and
determining if deviations of the real depth estimates other than the selected real depth estimate are within a predetermined range of the selected real depth estimate.

4. The method of claim 3, further comprising:
rendering the pixel at the selected real depth estimate if none of the other real depth estimates are within the predetermined range.

5. The method of claim 3, further comprising:
identifying the other real depth estimates that are within the predetermined range of the selected real depth estimate;
comparing votes for the selected real depth estimate with respective votes of each of the other real depth estimates that are within the predetermined range of the selected real depth estimate; and
selecting the real depth estimate with a maximum number of votes for rendering the pixel.

6. The method of claim 3, further comprising:
storing the real depth estimate in a processor-readable memory.

7. The method of claim 2, the iterative process further comprising:
iterating the steps of:
obtaining respective real depth estimates for the intersection of the ray from each of the plurality of neighbors,
calculating an interpolation point from the real depth estimates, and
employing the interpolation point as a new candidate point, and
stopping the iterations when a real depth estimate with deviation below the predetermined threshold is obtained.

8. The method of claim 7, wherein the interpolation point is an average of the real depth estimates.

9. The method of claim 2, wherein the neighbors of the plurality are coplanar.

10. The method of claim 2, wherein the plurality of neighbors comprises neighbors that are closest to the candidate point.

11. A computing apparatus comprising:
a processor;
a non-transitory processor readable storage medium comprising programming logic, the programming logic comprising:
range receiving logic that receives an upper bound and a lower bound for a neighborhood of rendering points to search for a rendering point to visibly render a pixel on a display device;
range determining logic that determines a range between the upper bound and the lower bound; and
point identifying logic that employs a voting process for the identification of the rendering point if the range is greater than a range threshold, and if the range not greater than the range threshold, identifies the rendering point via an iterative process that does not comprise the voting process; and rendering logic that renders the pixel at the identified rendering point.

12. The computing apparatus of claim 11, the point identifying logic further comprising:
ray receiving logic that receives a direction of a ray from an origin, an initial candidate point at which the ray will likely intersect a virtual object surface and a plurality of neighbors of the initial candidate point.

13. The computing apparatus of claim 12, the programming logic for the point identifying logic further comprising:
real depth obtaining logic that obtains respective real depth estimates for the intersection of the ray from each of the plurality of neighbors;
vote receiving logic that receives votes for the real depth estimates from each of the neighbors other than the neighbor providing the real depth estimate; and
deviation determining logic that determines respective deviations of each of the real depth estimates from the initial candidate point.

14. The computing apparatus of claim 13, the point identifying logic further comprising:
minimum deviation logic that selects one of the real depth estimates with a minimum deviation; and
logic for determining if deviations of the real depth estimates other than the selected real depth estimate are within a predetermined range of the selected real depth estimate.

15. The computing apparatus of claim 14, the point identifying logic further comprising:
real depth identifying logic that identifies the selected real depth estimate as the point for rendering the pixel if none of the other real depth estimates are within the predetermined range.

16. The computing apparatus of claim 14, the point identifying logic further comprising:
estimate identifying logic that identifies the other real depth estimates that are within the predetermined range of the selected real depth estimate;
vote counting logic that obtains a number of votes for each of the other real depth estimates that are within the predetermined range of the selected real depth estimate; and
real depth identifying logic that identifies the real depth estimate with a maximum number of votes for rendering the pixel.

17. The computing apparatus of claim 13, the point identifying logic that employs the iterative process logic further comprising:
calculating logic that calculates an interpolation point from the real depth estimates; and
iteration logic that employs the interpolation point as a new candidate point in a next iteration.

18. Non-transitory computer-readable storage medium comprising processor-executable instructions for:
receiving an upper bound and a lower bound for a neighborhood of rendering points to search for a rendering point to visibly render a pixel on a display device;
determining a range between the upper bound and the lower bound;
employing a voting process for the identification of the rendering point if the range is greater than a range threshold;
if the range not greater than the range threshold, identifying the rendering point via an iterative process that does not comprise the voting process; and
rendering the pixel at the identified rendering point.

19. The computer readable medium of claim 18, wherein the instructions for employing the voting process further comprise:
receiving a direction of a ray from an origin, a candidate point at which the ray will likely intersect a virtual object surface and a plurality of neighbors of the candidate point.

20. The computer readable medium of claim 19, wherein the instructions for employing the voting process further comprise:
obtaining respective real depth estimates for the intersection of the ray from each of the plurality of neighbors;
determining respective deviations of each of the real depth estimates from the candidate point;
selecting one of the real depth estimates with a minimum deviation; and
determining if deviations of the real depth estimates other than the selected real depth estimate are within a predetermined range of the selected real depth estimate.

21. The computer readable medium of claim 20, wherein the instructions for employing the voting process further comprise:
selecting the at least one real depth estimate as the point for rendering the pixel if none of the other real depth estimates are within the predetermined range.

22. The computer readable medium of claim 20, wherein the instructions for employing the voting process further comprise:
identifying the other real depth estimates that are within the predetermined range of the selected real depth estimate;
obtaining a number of votes for each of the other real depth estimates that are within the predetermined range of the selected real depth estimate;
selecting the real depth estimate with a maximum number of votes for rendering the pixel.

23. A method, implemented by a processor of a computing device, comprising:
receiving a direction of a ray from an origin and a candidate point at which the ray will likely intersect a virtual object surface, the candidate point is a candidate for a rendering point at which to render a pixel to be displayed on a display device;
selecting a set of points to define a search neighborhood including the candidate point, the selecting comprising determining a proximity range of neighboring points relative to the candidate point;
searching the search neighborhood to identify the rendering point at which to render the pixel to be displayed on the display device, the searching comprising a voting process, the voting process identifying the rendering point as the point in the search neighborhood receiving a maximum number of votes; and
rendering the pixel at the identified rendering point.

* * * * *